United States Patent Office 3,536,773
Patented Oct. 27, 1970

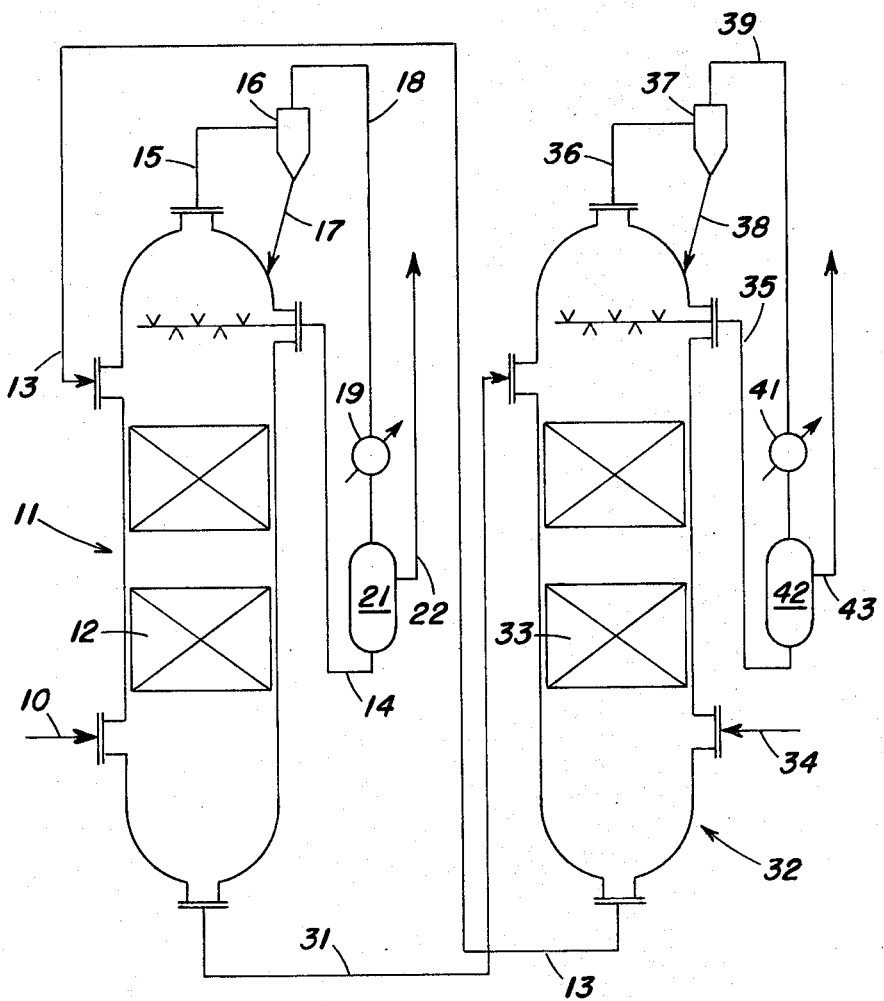

3,536,773
DEALKYLATION PROCESS
Herbert Riegel, Palisades, N.J., Harvey D. Schindler, New York, N.Y., and Morgan C. Sze, Upper Montclair, N.J., assignors to The Lummus Company, Bloomfield, N.J., a corporation of Delaware
Filed Oct. 23, 1968, Ser. No. 769,812
Int. Cl. C07c 3/58, 25/04, 25/14
U.S. Cl. 260—672      18 Claims

ABSTRACT OF THE DISCLOSURE

Process for dealkylating a feed containing an aromatic hydrocarbon having at least one methyl substituent wherein the feed is contacted with a melt containing a multivalent metal halide in both its higher and lower valence state, such as a mixture of cupric and cuprous chloride in the presence of an oxygen containing gas or the melt is previously contacted with an oxygen containing gas to produce the corresponding oxyhalide of the metal.

---

This invention relates to the production of aromatic hydrocarbons and more particularly to a process for dealkylating an alkyl substituted aromatic hydrocarbon.

The dealkylation of aromatic hydrocarbons is well-known in the art. In general, the dealkylation is effected by contacting an alkyl substituted aromatic hydrocarbon at temperatures between about 1300° and 1700° F. with a hydrogen-containing gas.

An object of this invention is to provide a new and improved process for effecting dealkylation of an alkyl-substituted aromatic hydrocarbon.

Another object of this invention is to provide a process for effecting dealkylation of an alkyl-substituted aromatic hydrocarbon at lower temperatures.

A further object of this invention is to provide a dealkylation process which does not require a hydrogen-containing gas.

These and other objects of the invention should be more readily apparent from the following detailed description thereof when read with reference to the accompanying drawing wherein:

The drawing is a simplified schematic flow diagram of an embodiment of the invention.

The objects of this invention are broadly accomplished, in one aspect, by contacting a feed, containing an alkyl-substituted aromatic hydrocarbon, with a melt containing a multivalent metal halide in both its higher and lower valence state to effect dealkylation thereof. The contacting is effected in the presence of an oxygen-containing gas or the melt is previously contacted with an oxygen containing gas whereby the melt includes the corresponding oxyhalide of the metal.

The melt contains a halide of a multivalent metal; i.e., a metal having more than one positive valence state, such as manganese, iron, copper, cobalt and chromium, preferably a chloride or bromide of the metal, with the copper chlorides and bromides, in particular the copper chlorides, being preferred. In the case of higher melting multivalent metal halides, such as copper chlorides, a halide of a univalent metal; i.e., a metal having only one positive valence state, which is nonvolatile and resistant to the action of oxygen under the process conditions is added to the multivalent metal halide to form a molten salt mixture having a reduced melting point. The univalent metal halides, the chlorides and bromides, particularly the chlorides, being preferred, are preferably alkali metal halides such as potassium and lithium chloride in particular, but it is to be understood that other metal chlorides and mixtures thereof, such as the heavy metal halides of Groups I, II, III and IV of the Periodic Table; e.g., zinc, silver, and thallium chloride, may also be employed. The univalent metal halides are generally added in an amount sufficient to adjust the melting point of the molten salt mixture to a temperature of below about 500° F., and in the case of a salt mixture of copper chloride and potassium chloride, the composition of the melt ranges between about 20% and about 40%, preferably about 30%, by weight, potassium chloride, with the remainder being copper chloride. It is to be understood, however, that in some cases the catalyst melt may have a melting point higher than 500° F., provided the catalyst remains in the form of the melt throughout the processing steps. It is further to be understood that the melt may contain a mixture of multivalent metal halides or other reaction promoters. It is also to be understood that in some cases the multivalent metal halide(s) may be maintained as a melt without the addition of a univalent metal halide.

The feed is generally a methyl substituted aromatic hydrocarbon; with the di- and mono-nuclear, in particular the mono-nuclear, aromatic hydrocarbons being preferred, i.e., benzene and naphthalene, with the aromatic nucleus generally containing no more than about three methyl groups. The preferred feeds contain toluene, the various xylenes and the various methyl naphthalenes. It is to be understood that the feed may contain two or more methyl substituted aromatic hydrocarbons.

In accordance with one embodiment of the invention, the feed to be dealkylated is contacted with the melt, containing the multivalent metal halide in both its higher and lower valence state, in the presence of an oxygen-containing gas, such as air. As an alternative procedure the melt containing a mixture of a multivalent metal halide in both its higher and lower valence state may be initially contacted with an oxygen containing gas and the resulting product, containing the corresponding oxyhalide of the multivalent metal, is then contacted in a separate reaction zone with the feed to be dealkylated. This procedure is of greater commercial value in that oxygen does not contact the feed, thereby decreasing any losses which may result from combustion of the feedstock.

The dealkylation as hereinabove described, is generally effected at temperatures from about 800° to about 1500° F., preferably from about 1100° to about 1400° F., and pressures from about 1 to about 30 atmospheres. The contacting is preferably effected in a countercurrent fashion, with the feed as a continuous vapor phase, at residence times between about 1 and about 100 seconds. The choice of optimum reaction conditions varies with the particular reactants and, therefore, the hereinabove described conditions are illustrative of the invention and the scope thereof is not to be limited thereby. It is further to be understood that by-products, such as chlorinated derivatives are also produced during the reaction and, therefore, the reaction conditions are controlled to reduce such production. The separation of the resulting by-products in order to recover the desired product may be effected by a wide variety of well-known procedures and, therefore, no detailed explanation thereof is deemed necessary.

In the embodiments of the invention wherein the melt is previously contacted with oxygen in a separate reaction zone, the conditions are similar to those employed in the dealkylation, except that lower temperatures are generally employed; i.e., from about 500° to about 1200° F.

In accordance with the invention, the melt containing the multivalent metal halide, participates in the reaction sequence and accordingly does not behave only as a catalyst. Therefore, the multivalent metal halides must be present in an amount sufficient to meet reaction requirements and in general the melt does not contain less than about 3%, by weight, of the higher valent metal halide although greater amounts thereof are generally preferred.

In some cases, the addition of chlorine may be required in order to maintain the necessary quantity of cupric chloride.

The melt in addition to functioning as a reactant and/or catalyst is a temperature regulator. Thus, the circulating melt has a high heat absorption capacity thereby preventing runaway reaction during the dealkylation and oxygen contacting steps. The absorbed heat of reaction may be employed to heat the various reactants to reaction temperature. Alternatively, or in addition to such an expedient, the melt may be contacted with an inert gas coolant to remove any additional heat of reaction, with the inert gas being subsequently cooled and re-employed for removing heat from the melt. It should also be apparent that heat may be added, if necessary, or removed by any of a wide variety of means. It should also be apparent that the heat absorption capacity of the melt functions to regulate the temperature during the dealkylation, thereby preventing a runaway reaction.

The invention will now be further described with reference to an embodiment thereof illustrated in the accompanying drawing. It is to be understood however, that the scope of the invention is not to be limited thereby.

Referring now to the drawing, an oxygen-containing gas in line 10, such as air, is introduced into a reactor 11, containing suitable packing 12 or other liquid-vapor contacting devices. A melt containing a multivalent metal halide in both its higher and lower valence state, such as a mixture of cupric and cuprous chloride, is introduced into reactor 11 through line 13 in the form of a melt and countercurrently contacts the ascending oxygen-containing gas. The melt may further contain an alkali metal chloride, such as potassium chloride. As a result of such contact, a portion of the cuprous chloride is exothermically converted to copper oxychloride.

An oxygen depleted gas in the top of the reactor 11 is contacted with a quench liquid introduced through line 14, resulting in condensation of vaporized melt and vaporization of quench liquor. The vaporized quench liquid and oxygen-depleted gas are withdrawn from reactor 11 through line 15 and introduced into a cyclone separator 16 to effect separation of entrained catalyst. The separated catalyst is withdrawn from separator 16 through line 17 and returned to the reactor 11. The combined oxygen-depleted gas-vaporized quench liquid is withdrawn from separator 16 through line 18, passed through condenser 19 to effect condensation of the quench liquid and the vapor-liquid mixture introduced into a separator 21. The quench liquid is withdrawn from separator 21 through line 14 and recycled to the reactor 11. The oxygen-depleted gas is withdrawn from separator 21 through line 22 and passed to waste.

The melt containing a mixture of cuprous chloride, cupric chloride and copper oxychloride is withdrawn from reactor 11 through line 31 and introduced into the top of a dealkylation reactor 32, containing suitable packing 33 or other gas-liquid contacting devices. A feed to be dealkylated, such as toluene, is introduced into the bottom of vessel 32 through line 34 and countercurrently contacts the descending melt to effect dealkylation of the feed. The melt withdrawn from the bottom of vessel 32 through line 13 is now recycled to reactor 11.

A gaseous effluent containing the corresponding dealkylated compound, such as benzene, and by-products, is contacted in the top of vessel 32 with a quench liquid introduced through line 35, resulting in condensation of vaporized catalyst melt and vaporization of the quench liquid. The vaporized quench liquid and effluent is withdrawn from vessel 32 through line 36 and introduced into a cyclone separator 37 to effect removal of entrained catalyst. The separated catalyst is withdrawn from separator 37 through line 38 and recycled to the vessel 32. The vaporized quench liquid and gaseous effluent are withdrawn from separator 37 through line 39, passed through condenser 41 to effect condensation and cooling of the quench liquid and the gas-liquid mixture introduced into a separator 42. The now cooled quench liquid is withdrawn from separator 42 through line 35 and recycled to the reactor 32. The effluent is withdrawn from separator 42 through line 43 and passed to separation and recovery.

It is to be understood that numerous variations of the hereinabove described processing sequence are possible within the spirit and scope of the invention. Thus, for example, the dealkylation reaction may be effected in a single reactor having two separate zones, one for the introduction of an oxygen-containing gas for contact with the melt and the other for contacting the resulting oxygenated melt with the feed to be dealkylated. Alternatively, as hereinabove described, the melt containing the multivalent metal halide in both its higher and lower valence state, may be contacted with a mixture of an oxygen-containing gas and a feed to be dealkylated in a single reaction zone. These and other modifications should be apparent to those skilled in the art from the teachings contained herein.

The invention is further illustrated by the following example, but the scope of the invention is not to be limited thereby:

EXAMPLE I

Toluene was dealkylated by contacting toluene with a copper chloride melt continuously circulating between the toluene contacting step and an air contacting step. Ethane was introduced with the feed to lower toluene partial pressure. The conditions were as follows:

Reaction temperature—453° C.
Reaction pressure—1 atmosphere
Molten salt:
    KCl—30 wt. percent
    CuCl—55 wt. percent
    $CuCl_2$—15 wt. percent
Residence time—10 seconds
Duration of test—3 hours
Gas hourly space velocity, GHSV—76
Feed rate, gm.-moles/hr.:
    Toluene—0.11
    Ethane—0.22
Toluene conversion—4.5%
Products: (aromatics)

| Component: | Mole percent toluene converted |
|---|---|
| $C_6H_6$ | 23.2 |
| $C_6H_5Cl$ | 2.3 |
| $C_6H_5(CH_2Cl)$ | 67.1 |
| $C_6H_4Cl(CH_3)$ | 7.4 |

EXAMPLE II

Xylene (meta isomer) is dealkylated by contacting xylene with a copper chloride melt continuously circulating between the xylene contacting step and an air contacting step. Ethane is introduced with the feed to lower the xylene partial pressure. The conditions are as follows:

Reaction temperature—450° C.
Reaction pressure—1 atm.
Molten Salt:
    KCl—30 wt. percent
    CuCl—55 wt. percent
    $CuCl_2$—15 wt. percent
Residence time—10 sec.
Duration of test—2 hours
Gas hourly space velocity, GHSV—76
Feed rate, gm.-mole/hr.:
    m-Xylene—0.11
    Ethane—0.22
Xylene conversion—8.2%

The dealkylation products contain both benzene and toluene.

EXAMPLE III 1-methyl naphthalene is dealkylated by effecting contacting thereof with a copper chloride melt which is previously contacted with air, under the following conditions:

Reaction temperature—440° C.
Reaction pressure—1 atm.
Molten salt:
    KCl—30 wt. percent
    CuCl—55 wt. percent
    $CuCl_2$—15 wt. percent
Residence time—10 seconds
Duration of test—2 hours
Gas hourly space velocity, GHSV—76
Feed rate, gm.-mol/hr.:
    1-methylnaphthalene—0.11
    Ethane—0.22
1-methylnaphthalene conversion—9.1%

The reaction product contains naphthalene.

EXAMPLE IV

The procedure of Example I is repeated except that the melt has the following composition:

$FeCl_2$—70 wt. percent
$FeCl_3$—5 wt. percent
KCl—25 wt. percent

The reaction product contains benzene.

EXAMPLE V

The procedure of Example II is repeated except that the melt has the following composition:

$MnCl_2$—4 wt. percent
$MnCl_4$—78 wt. percent
KCl—18 wt. percent

The reaction product contains benzene and toluene.

EXAMPLE VI

The procedure of Example III is repeated except that the melt has the following composition:

$CoCl_2$—43 wt. percent
$CoCl_3$—17 wt. percent
KCl—40 wt. percent

The reaction product contains naphthalene.

EXAMPLE VII

The procedure of Example I is repeated except that the melt has the following composition:

$CrCl_2$—12 wt. percent
$CrCl_3$—66 wt. percent
KCl—22 wt. percent

The reaction product contains benzene.

The hereinabove examples are also repeated with bromides and iodides of the multivalent metals with similar results.

The process of the invention is advantageous in that dealkylation may be effected at lower temperatures than heretofore employed in the art. In addition, overall costs are reduced by eliminating the necessity of employing hydrogen as a reactant. These and other advantages should be readily apparent to those skilled in the art.

Numerous modifications and variations in the present invention are possible in light of the above teachings and, therefore, it is to be understood that the invention may be practiced otherwise than as particularly described.

What is claimed is:

1. A process for dealkylating a feed containing at least one methyl substituted aromatic hydrocarbon comprising: contacting the feed with oxygen and a melt containing a multi-valent metal halide in both its higher and lower valence state at a temperature from about 800° F. to about 1500° F. to produce an effluent containing the demethylated aromatic hydrocarbon.

2. The process as defined in claim 1 wherein the multi-valent metal halide is selected from the group consisting of the chlorides of manganese, copper, iron, cobalt and chromium.

3. The process as defined in claim 2 wherein the melt contains a mixture of cuprous and cupric chloride.

4. The process as defined in claim 3 wherein the contacting is effected at a temperature between about 1100° and about 1400° F.

5. The process as defined in claim 3 wherein the melt further includes a univalent metal halide.

6. The process as defined in claim 5 wherein the univalent metal halide is an alkali metal chloride.

7. The process as defined in claim 3 wherein the feed contains toluene.

8. The process as defined in claim 3 wherein the feed contains xylene.

9. The process as defined in claim 3 wherein the feed contains methyl naphthalene.

10. A process for dealkylating a feed containing at least one methyl substituted aromatic hydrocarbon comprising:
(a) contacting a melt containing a multivalent metal halide in both its higher and lower valence state with an oxygen containing gas;
(b) contacting the melt of step (a) with the feed at a temperature from about 800° F. to about 1500° F. to effect dealkylation thereof; and
(c) recycling the melt from step (b) to step (a).

11. The process as defined in claim 10 wherein the multivalent metal halide is selected from the group consisting of the chlorides of manganese, copper, iron, cobalt and chromium.

12. The process as defined in claim 10 wherein the melt contains a mixture of cuprous and cupric chloride.

13. The process as defined in claim 12 wherein the contacting of steps (a) and (b) is effected at a temperature between about 1100° and about 1400° F.

14. The process as defined in claim 12 wherein the melt further includes a univalent metal halide.

15. The process as defined in claim 14 wherein the univalent metal halide is an alkali metal chloride.

16. The process as defined in claim 12 wherein the feed contains toluene.

17. The process as defined in claim 12 wherein the feed contains xylene.

18. The process as defined in claim 12 wherein the feed contains methyl naphthalene.

References Cited

UNITED STATES PATENTS

| | | | |
|---|---|---|---|
| 1,419,124 | 6/1922 | Rittman | 260—672 |
| 2,431,515 | 11/1947 | Shepardson | 260—672 |
| 3,148,222 | 8/1964 | Penner et al. | 260—650 |

DELBERT E. GANTZ, Primary Examiner

G. E. SCHMITKONS, Assistant Examiner

U.S. Cl. X.R.

260—650, 651